Patented Oct. 15, 1935

2,017,182

UNITED STATES PATENT OFFICE 2,017,182

MANUFACTURE OF ANHYDRIDES OF ALKOXY FATTY ACIDS

Carl J. Malm and Charles R. Fordyce, Rochester, N. Y., assignors to Eastman Kodak Company, Rochester, N. Y., a corporation of New York No Drawing. Application January 23, 1932, Serial No. 588,494

6 Claims. (Cl. 260—123)

This invention relates to the manufacture of the anhydrides of alkoxy fatty acids, and has for its object to provide a simple and convenient method of preparing them from the alkoxy fatty acids themselves. According to Beilstein, fourth edition, Volume III, page 240, ethoxyacetic anhydride, for instance, is ordinarily made by the reaction of ethoxyacetyl chloride and potassium ethoxyacetate. According to this process, therefore, starting with ethoxyacetic acid, it is necessary to convert part of the acid into the acid chloride and part of it into a salt. This involves expensive conversion operations. Moreover, it is well known that the acid chlorides are extremely unpleasant to work with on account of their suffocating odor. Other processes for preparing the anhydrides of the alkoxy fatty acids have been proposed, but so far as we are aware, no one has suggested a method of such simplicity as that which constitutes our invention.

We have discovered that the anhydrides of the alkoxy fatty acids, such, for instance, as methoxyacetic acid, ethoxyacetic acid, alpha-methoxypropionic acid, and the like, may be prepared by adding acetic anhydride to the alkoxy fatty acid and distilling at such a temperature that the acetic acid formed is distilled off, while the anhydride of the alkoxy fatty acid remains behind. We give below an example of the method of carrying our invention into effect.

A little more than one mol. of acetic anhydride, for example 1.1 mols, is added to two mols of an alkoxy fatty acid, for instance ethoxyacetic acid. The mixture is subjected to a fractional distillation. The fraction boiling below 119° C is removed. This fraction consists mostly of acetic acid. The fraction coming over between 119° C. and the boiling point of the alkoxy fatty acid anhydride is collected separately and added to a subsequent batch. The high-boiling fraction remaining in the distilling vessel consists mostly of the alkoxy fatty acid anhydride. It may be used directly, if a high degree of purity is not required, or it may be purified by distillation, preferably under reduced pressure.

It will be understood that the proportions may be varied somewhat, but the most economical proportions are those which provide a slight excess of acetic anhydride over the one mol. which is theoretically required to react with two mols of the alkoxy fatty acid.

It will likewise be understood that the process may be applied to other alkoxy fatty acids than those which we have specifically mentioned. Mixtures of alkoxy fatty acids may also be used. Other fatty acid anhydrides may be used in place of acetic anhydride, provided that there is a considerable difference between the boiling point of the corresponding fatty acid and that of the alkoxy fatty acid employed. In this case, the first fraction in the distillation should be collected up to a temperature slightly above the boiling point of the fatty acid corresponding to the anhydride employed, instead of up to 119° C. as in the case where acetic anhydride is employed.

What we claim as our invention and desire to be secured by Letters Patent of the United States is:

1. A process of preparing a lower alkoxy fatty acid anhydride from the corresponding alkoxy fatty acid, which comprises heating the alkoxy fatty acid with the anhydride of a fatty acid, the boiling point of the acid corresponding to the anhydride employed in the reaction being considerably lower than the boiling point of the alkoxy fatty acid employed in the reaction, and distilling off the fatty acid formed in the reaction.

2. A process of preparing a lower alkoxy fatty acid anhydride from the corresponding alkoxy fatty acid, which comprises heating approximately 2 molecular proportions of the alkoxy fatty acid with approximately one molecular proportion of the anhydride of a fatty acid, the boiling point of the acid corresponding to the anhydride employed in the reaction being considerably lower than the boiling point of the alkoxy fatty acid employed in the reaction, and distilling off the fatty acid formed in the reaction.

3. A process of preparing a lower alkoxy fatty acid anhydride from the corresponding alkoxy fatty acid, which comprises heating the alkoxy fatty acid with the anhydride of a fatty acid, the boiling point of the acid corresponding to the anhydride employed in the reaction being considerably lower than the boiling point of the alkoxy fatty acid employed in the reaction, distilling off the fatty acid formed in the reaction, and purifying the alkoxy fatty acid anhydride.

4. A process of preparing a lower alkoxy fatty acid anhydride from the corresponding alkoxy fatty acid, which comprises heating the alkoxy fatty acid with acetic anhydride, and distilling off the acetic acid formed in the reaction.

5. A process of preparing a lower alkoxy fatty acid anhydride from the corresponding alkoxy fatty acid, which comprises heating approximately two molecular proportions of the alkoxy fatty acid with approximately one molecular proportion of acetic anhydride, and distilling off the acetic acid formed in the reaction.

6. A process of preparing a lower alkoxy fatty acid anhydride from the corresponding alkoxy fatty acid, which comprises heating the alkoxy fatty acid with acetic anhydride, distilling off the acetic acid formed in the reaction, and purifying the alkoxy fatty acid anhydride.

CARL J. MALM.
CHARLES R. FORDYCE.